Patented Sept. 29, 1936

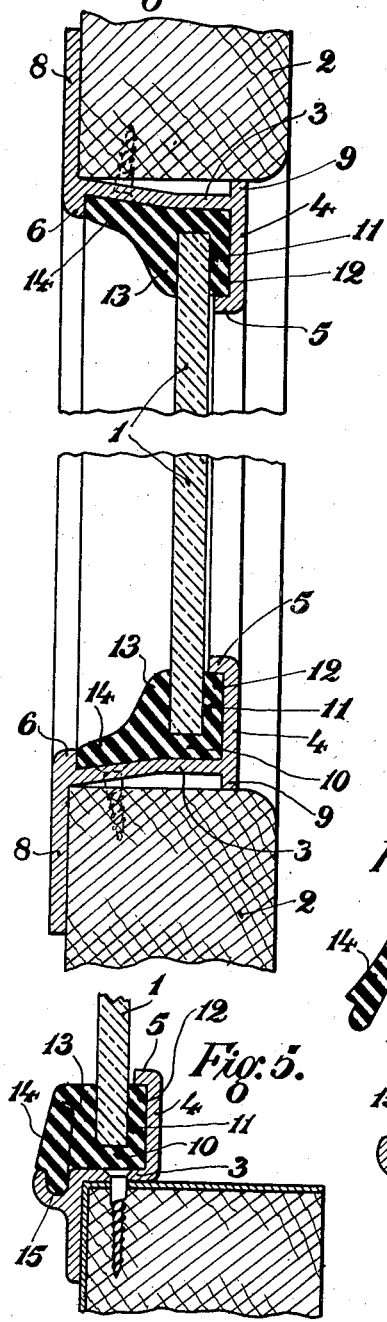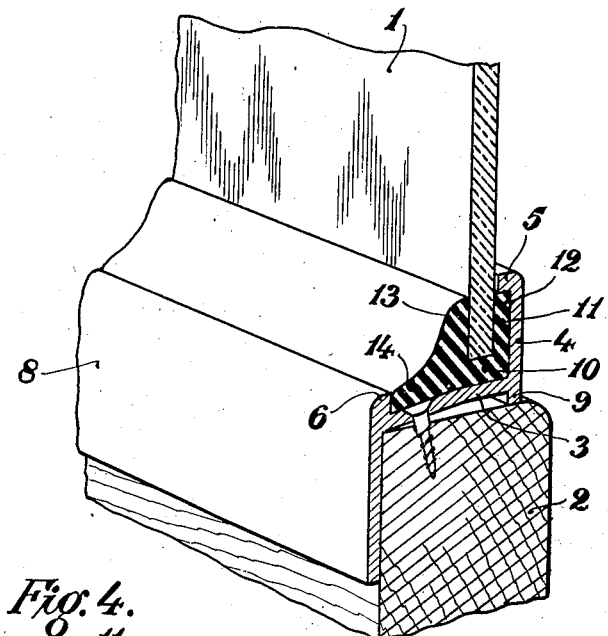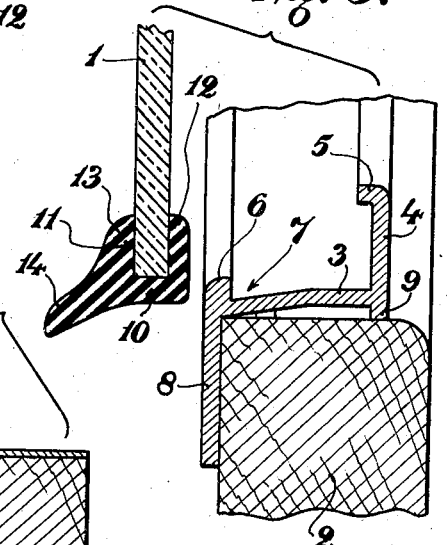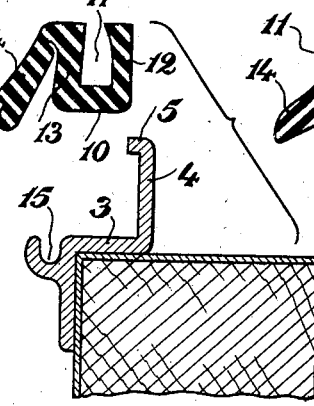

2,056,024

UNITED STATES PATENT OFFICE 2,056,024

MEANS FOR SECURING PANELS WITHIN THEIR FRAMES

Frederick Joseph Stuart, Birmingham, England, assignor of one-fourth to Herbert Linwood Sleigh and one-fourth to Arthur Sam Cheston, both of Birmingham, England Application August 5, 1935, Serial No. 34,736
In Great Britain August 14, 1934

7 Claims. (Cl. 20—56.4)

This invention relates to vehicle or other windows, or to panels or the like of glass or other material, which are carried by, or fitted within, an outer frame or surround. It has hitherto been the practice, particularly in the case of vehicle windows, or the glass panels of show-cases or the like, to secure the glass in place by wooden or other strips or fillets attached by screws or nails, and the object of the present invention is to provide improved and simplified means for holding the glass, or other panel or the like, in place without the use of fillets or like securing means, in such a manner that the glass or panel may be readily removed, without disturbing the surrounding framework, if required.

According to the invention a window or other panel or the like is fitted with an edging strip grooved or channelled to receive the edge of the panel or glass and engaging, or fitted into, an outer frame having at one side or edge a ledge or projecting part, or a recess or rebate, the said edging strip being provided at one side with a resilient or yielding projecting part or flange adapted to engage behind the ledge or projecting part of the frame, or within the recess or rebate of the latter. This resilient or yielding projecting part or flange of the edging strip may be arranged to project outwards of, or below, the base or bottom of the groove or channel which receives the panel, the edging strip, and the flange or projecting part, being made of rubber or other material, and being preferably so constructed or shaped that the projecting part or flange is caused to be pressed closely against the frame, behind the ledge, or within the recess or rebate, so that the panel or glass is retained within the frame solely by means of the edging strip. The sides of the groove or channel which receives the edge of the panel or glass are preferably arranged so that they converge before the panel or glass is fitted within the channel, the opening out of the sides to receive the panel or glass causing the projecting part or flange to move relatively to the bottom of the channel, so that it presses more closely against the fixed frame when fitted, with the window or panel, into the latter.

Also according to the invention a rubber edging strip for a window or other panel or the like is provided having a groove or channel to receive the edge of the panel or glass and provided at one or each side of the groove or channel with a resilient projecting part or flange extending below or outwards of the base of the groove or channel.

As stated above, the groove or channel preferably has converging sides, which, when opened out to receive the glass cause the resilient projecting part or flange to move relatively to the base of the groove or channel.

Figure 1 of the accompanying drawing represents a vertical section through a vehicle window, in which the glass is fitted with, and retained in place by, a rubber edging strip constructed in accordance with this invention.

Figure 2 is a sectional perspective view of the lower portion of the window panel and of the rubber edging strip and frame.

Figure 3 shows, in section, the edging strip fitted to the lower edge of the window panel, but before being engaged within the metal frame.

Figure 4 represents a cross-section through the edging strip before being fitted to the glass and engaged within the outer frame, showing the manner in which the walls or sides of the groove or channel converge.

Figure 5 is a sectional view showing a modified form of edging strip applied to the lower edge of a window panel and engaging a modified form of outer frame.

Figure 6 shows the edging strip illustrated in the preceding figure removed from the glass and outer frame, the latter being shown separately.

Referring to Figures 1 to 4 of the drawing, the window opening within which the panel or glass 1 of the window is fitted is provided with a square or rectangular metal frame rigidly secured to the woodwork 2 surrounding the opening by screws or other means. The vertical side members and the horizontal top and bottom portions of this metal frame are of a similar cross-sectional shape, each comprising a base portion 3, opposed to the edge of the glass 1, and a deep wall 4, disposed in a vertical plane and formed integral with the one side of the base portion 3, the said wall extending along the entire length of the latter and projecting into the window opening, the edge of the wall 4 being provided with an integral inwardly-presented lip 5 which is opposed to the face of the glass 1 when the latter is fitted in place. That portion of the base 3 of the metal frame which lies adjacent the wall 4 is disposed at right-angles to the latter, the base being then inclined slightly, as shown in Figures 1 and 3, whilst provided along the edge of the base 3 which is opposite to the wall 4 is a narrow upstanding ledge or lip 6, which forms, with the inclined part of the base 3, a shallow rebate or recess 7 (Figure 3). Formed as a continuation of the ledge or lip 6, and extending over the woodwork 2 surrounding the window opening, is a plate 8, a narrow flange or rim 9 being provided, if desired, at the opposite side as shown. In order to secure the panel or glass 1 of the window in place within the outer metal frame thus formed, there is provided a rubber edging strip 10 having a groove or channel 11 extending throughout its entire length to receive the edges of the glass 1, the said rubber edging being adapted to extend completely around the latter so as to come between the same and the metal frame. The wall 12 which forms the one side of the groove or channel 11 is of a substantial uniform thickness, as shown, being, if desired, slightly inturned at its extreme edge, whilst the opposite wall 13, on the other hand, is of a tapering cross-sectional shape and formed integral with this wall 13 is a laterally-projecting tapering rubber flap or flange 14 which extends along the one side of the groove or channel 11 for the full length of the edging strip. This integral rubber flange 14 is initially slightly inclined as illustrated in Figure 4 of the drawing, so that it is directed outwards and lies at a small angle to that portion of the outer face of the base of the edging strip which lies opposite the groove or channel 11. The maximum width of the edging strip 10, including the flange 14, is slightly greater than the distance between the wall 4 and flange 6 of the metal edging, whilst the said edging strip is so formed or moulded that the opposed inner walls of the groove or channel 11 formed therein initially converge toward one another, as shown in Figure 4.

In order to fit the window glass 1 within the metal frame surrounding the window opening the edges of the glass are first engaged within the groove or channel 11 of the edging strip 10, which is arranged to extend completely around the glass, as stated, and the construction of the rubber edging is such that before the glass can be fitted within the channel 11 the sides of the latter have to be forced apart, the glass 1, when fitted, holding them apart in parallel relationship. This action of forcing apart the sides of the channel 11 causes the resilient rubber flap or flange 14 at the one side of the edging to be displaced outwards from, or below, its original position throughout its entire length, into the position indicated by dotted lines in Figure 4. When the rubber edging strip 10 has been applied to the edges of the glass 1 the latter is ready for fitting into the frame, and in order to accomplish this the edge of the wall 12 of the edging strip is first engaged beneath the lip 5 at the edge of the deep side wall 4 of the metal frame, the edging strip being pushed into place until it rests on the portion 3 of the metal frame adjacent the wall 4, with the flange 14 of the edging strip lying against the ledge or flange 6. During this action the flap or flange 14 freely flexes relatively to the channel portion of the strip, namely, at a point adjacent the lower edge of the outer wall of the channel. The flange 14 along each edge of the glass is then manipulated in turn and forced over the ledge or flange 6, the said flange, owing to the deformation of the edging strip due to the fitting of the glass, immediately springing outwards behind the flange 6, into the recess or rebate 7, so that it presses closely against the bottom of the latter. In this manner the edging strip is securely held in place within the metal frame, the glass being firmly held in position without any other securing means, such, for example, as fillets or the like. At the same time the glass is securely gripped between the opposed sides of the groove or channel in the rubber edging strip, owing to the said sides tending to move towards one another into their original positions and the strip is held in a state of lateral compression.

The improved arrangement enables the glass to be fitted into place far more quickly than is possible with previous methods, such as where separate fillets, corner-pieces and the like, have to be employed, whilst owing to the absence of fillets or corner-pieces the cost of fitting is materially reduced. A further advantage is that water cannot gain access to the inner face of the metal frame and so cause rusting of the latter, or rotting of the woodwork where a wooden frame is employed, which is possible where separate wooden fillets are used. Also strain due to badly fitted fillets, or to body movements, in the case of vehicles, which might cause breakage of the glass, is avoided. The invention is of particular value when applied to the windows of vehicles or ships, since the rubber edging and the outer frame may be arranged so that the glass can be fitted either from the outside or from the inside, as desired.

Not only can the glass be easily and quickly fitted into place, as above stated, but it may equally readily be removed, such as in the case of a cracked or broken glass, it being merely necessary to spring or lever up the rubber flap or flange over the ledge of the surrounding frame; whilst the same rubber edging may be used several times, if desired.

The improved rubber edging is particularly suitable for fitting to glass having rounded corners, and the said edging can be fitted either in one length, with the adjoining ends disposed, for example, at the top, or the ends of a single length of edging may be vulcanized together and the edging then stretched over the edges of the glass.

The surrounding framework may be of metal, wood or other material, and the part for receiving the edging strip may be of any suitable cross-sectional shape, provided it has a rebate or recess to receive the flange or flap of the edging after the latter has been deformed, or provided it is formed with a ledge or projecting part behind which the said flange or flap may be engaged.

In the modified arrangement illustrated in Figures 5 and 6 of the drawing, a channelled rubber edging strip 10 is provided having integral with the upper edge of one side an integral flexible flap or flange 14 adapted, when fitted into the metal frame, to lie against the outer face of the wall 13 of the edging strip, so as to project down below or outwards of the base of the grooved or channelled portion. The channel or groove 11 with which the edging strip is provided is adapted to be fitted over the edge of the glass panel 1 of the window, the opposed side walls of the channel being preferably arranged to converge slightly before the glass is fitted, as shown in Figure 6. The metal frame for use with this form of rubber edging has a flat base portion 3 with an integral wall 4 at one side disposed at right-angles and having at its extreme edge, as in the previous arrangement, a bead or lip 5. At the side opposite the wall a deep recess or groove 15 is provided, as shown, which extends along the full length of the metal frame. After the edging strip has been applied to the edge of the glass 1 the glass and edging strip are fitted into the frame, the edge of the wall 12 being engaged beneath the lip 5 of the latter. The edge of the flange 14 is then forced over the edge of the frame into the recess or groove 15, its resiliency causing it to move down automatically into the latter, so that it is pressed against the bottom of same. Also the strip is held in lateral compression. The window panel is thus held firmly in place without any other securing means, and the lip 5 serves to hold the rubber in position if the glass is cut to a size so small that it does not press against the rubber all the way round.

The invention may be applied to all kinds of windows, or to glass or other panels or the like, in the same way as above described.

Having fully described my invention, what I desire to claim and secure by Letters Patent is:—

1. The combination with a panel, of an outer frame consisting of a base part having an upstanding wall at one side and a longitudinal recess adjacent the opposite side said recess being bounded upon the outer side by a lip, and a panel retaining strip of rubber or like resilient material consisting of a channel-sectioned body part fitted to each edge of the panel and seated upon the base part and against the upstanding wall of the frame, the panel with the fitted strip being insertable as a unit into the frame in a direction at right-angles to the plane of the frame, and said channel body part of the strip having a rear wall and base of substantial thickness and being provided at the outer side with an elastic buttress flap, having a thin flexible edge portion, joined to the outer wall of the channel body part, said flap projecting below the base of said body so as to resiliently engage the recess by being sprung thereinto after the insertion of the panel with fitted strip into the frame and being freely flexible relatively to said channel body about a point adjacent the outer wall of the channel body to enable its outer flexible edge to be sprung over and behind the lip and into the recess of the frame without distortion of said body, and the said strip having an initial width greater than the width between the wall and the outer lip of the frame such that when it is in position in the frame and its flap has been sprung over the lip, it is maintained in lateral compression between the wall and the lip and when raised above the lip it springs outwards over the said lip.

2. The combination with a panel, of an outer frame consisting of a base part having a flat seating in a plane at right-angles to the plane of the frame and an upstanding wall at one side of the seating and also a longitudinal recess adjacent the opposite side of the seating, said recess being bounded by a lip situated below the edge of the panel, and a panel retaining strip made of rubber or like resilient material consisting of a channel-sectioned body part fitted to each edge of the panel, said body part having a rear wall and base of substantial thickness and a flat bottom face in a plane at right-angles to the plane of the panel and supported upon the flat seating of the frame, the panel with the fitted strip being insertable as a unit into the frame in a direction at right-angles to the plane of the frame, and said strip being provided at its outer side with an elastic buttress flap, having a thin flexible edge portion, joined to the outer wall of the channel body part, said flap projecting below the base of said body so as to resiliently engage the recess by being sprung thereinto after the insertion of the panel with fitted strip into the frame and being freely flexible relatively to said channel body about a point adjacent the outer wall of the channel body to enable its outer flexible edge to be sprung over and behind the lip of the frame without distortion of said body, and the strip having an initial width such that when it is in position in the frame it is maintained in lateral compression between the wall and the lip and when raised above the lip it springs outwards over the said lip.

3. The combination with a panel, of an outer frame consisting of a base part having at one side an upstanding wall provided with a flange overhanging the base part and adjacent the opposite side with a longitudinal recess bounded upon its outer side by a lip, and a panel retaining strip made of rubber or like resilient material consisting of a channel-sectioned body part fitted to each edge of the panel and seated upon the base part and against the upstanding wall of the frame so as to engage beneath the overhanging flange of said wall, the panel with the fitted strip being insertable as a unit into the frame in a direction at right-angles to the plane of the frame, and said strip having a rear wall and base of substantial thickness and being provided at the outer side with an elastic buttress flap joined to the outer wall of the channel body part, said flap projecting below the base of said body so as to resiliently engage the recess by being sprung thereinto after the insertion of the panel with fitted strip into the frame and being freely flexible relatively to said channel body about a point adjacent the outer wall of the channel body to enable its outer edge to be sprung over and behind the lip without distortion of said body, and said strip being maintained in lateral compression between the wall and the lip.

4. The combination with a panel, of an outer frame consisting of a base part having adjacent an edge a longitudinal recess bounded by a lip, and a resilient panel-retaining strip, made of rubber or like resilient material, consisting of a channel-sectioned body part fitted to each edge of the panel and seated upon the frame base part, the said strip being provided with a rear wall and base of substantial thickness and a laterally-extending elastic buttress flap integral with and extending to the top of the outer wall of the channel and continuous with the base and having a concave outer face forming a thin flexible edge portion, said flap projecting below the base of said body part so as to resiliently engage the recess by being sprung thereinto and being freely flexible relatively to said channel body about a point situated adjacent the base of the side wall of the channel body by which it is carried so as to enable its outer flexible edge to be sprung over and behind the lip and into the recess without distortion of said body.

5. The combination with a panel, of an outer frame consisting of a flat base part and having adjacent an edge a longitudinal recess bounded by a lip situated wholly below the said flat base part, and a resilient panel-retaining strip made of rubber or like resilient material consisting of a channel-sectioned body part having a rear wall and base of substantial thickness fitted to each edge of the panel and seated on the flat base part of the frame, the said strip being provided with a laterally-situated flexible flap resiliently joined to a side wall of the channel body solely at the outer edge thereof and by a relatively thinner part about which it is free to flex relatively to said body and depending over but being separate from the lower part of said channel wall and having its edge extending below the base of said body part so as to resiliently engage the recess in the frame by being sprung thereinto, said flap being initially spaced from the channel body wall but when in position being pressed into contact with said wall.

6. The combination with a panel, of an outer frame consisting of a flat base part having at one side an upstanding wall provided with a flange overhanging the base and having adjacent the opposite side a longitudinal recess bounded by a lip situated wholly below the flat base part, and a resilient panel-retaining strip made of rubber or like resilient material consisting of a channel-sectioned body part having a rear wall and base of substantial thickness fitted to each edge of the panel and seated on the flat base part of the frame against the upstanding wall and beneath the overhanging flange, the said strip being provided with a laterally-situated flexible flap resiliently joined to the outer side wall of the channel body solely at the outer edge thereof about which it is free to flex relatively to and away from the said body and depending over but being separate from the lower part of said channel wall and having its free edge extending below the base of said body part so as to resiliently engage the recess in the frame by being sprung thereinto, and the overall width of the said strip being initially greater than the distance between the upstanding wall and the lip of the frame so that when in position it is maintained in a state of lateral compression between said wall and lip and in contact with the wall of the channel body part, and when raised above the lip springs outwards over said lip.

7. A device for securing a panel within its frame consisting of a rubber channel member having a rear wall and base of substantial thickness adapted to receive an edge of the panel and provided with a laterally situated flexible flap integrally joined to a side wall of the channel body solely at the upper edge thereof and by a relatively thinner part about which it is free to flex relatively to said body and depending obliquely from said upper edge so as to be spaced from the lower part of said channel wall and having its free edge extending below the base of said body part for resilient engagement with a recess in the panel frame, said flap being adapted to be pressed into contact with said channel wall but tending to spring away from the same.

FREDERICK JOSEPH STUART.